Dec. 7, 1954   C. W. DEMAREST   2,696,184
APPARATUS FOR FORMING HOLLOW BODIES
Filed May 16, 1951   2 Sheets-Sheet 2
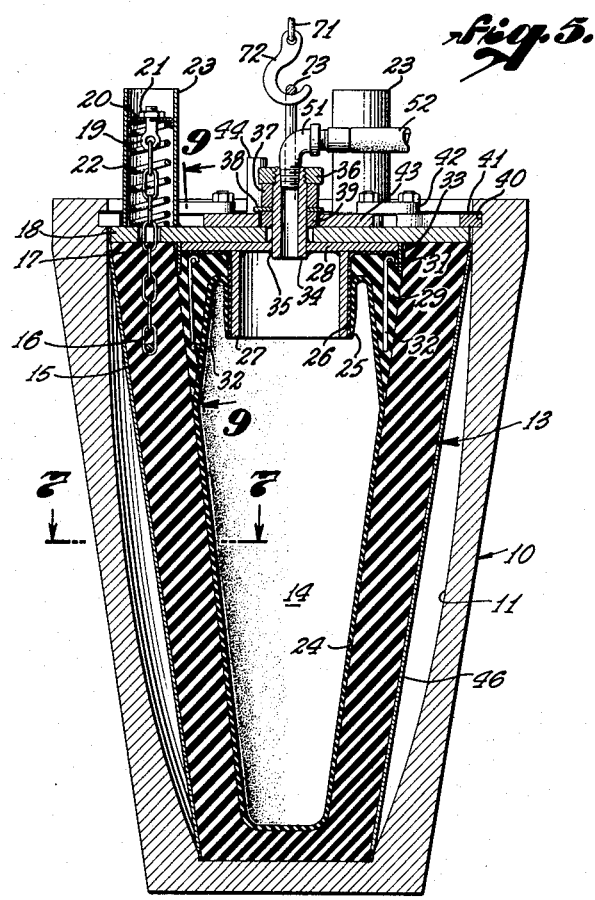
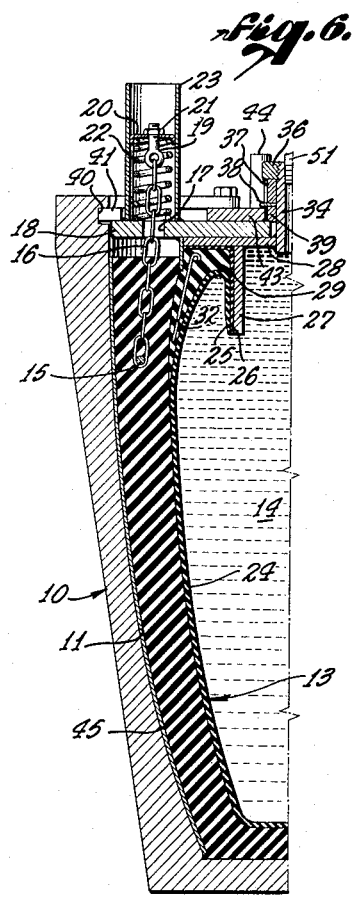
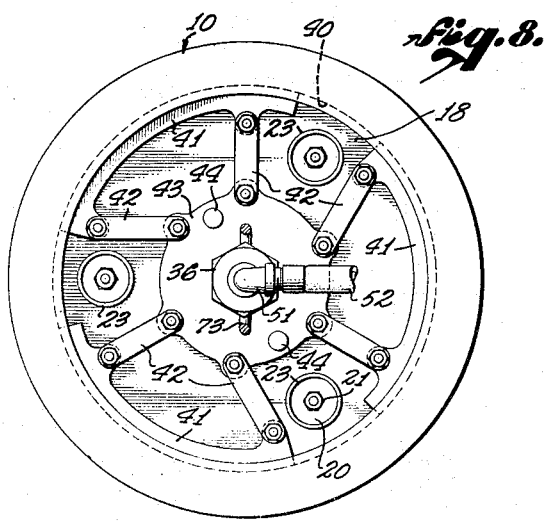
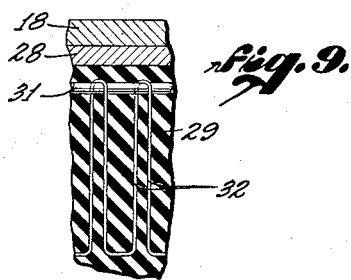
CHARLES W. DEMAREST,
INVENTOR.
BY *George W. Smyth*
ATTORNEY.

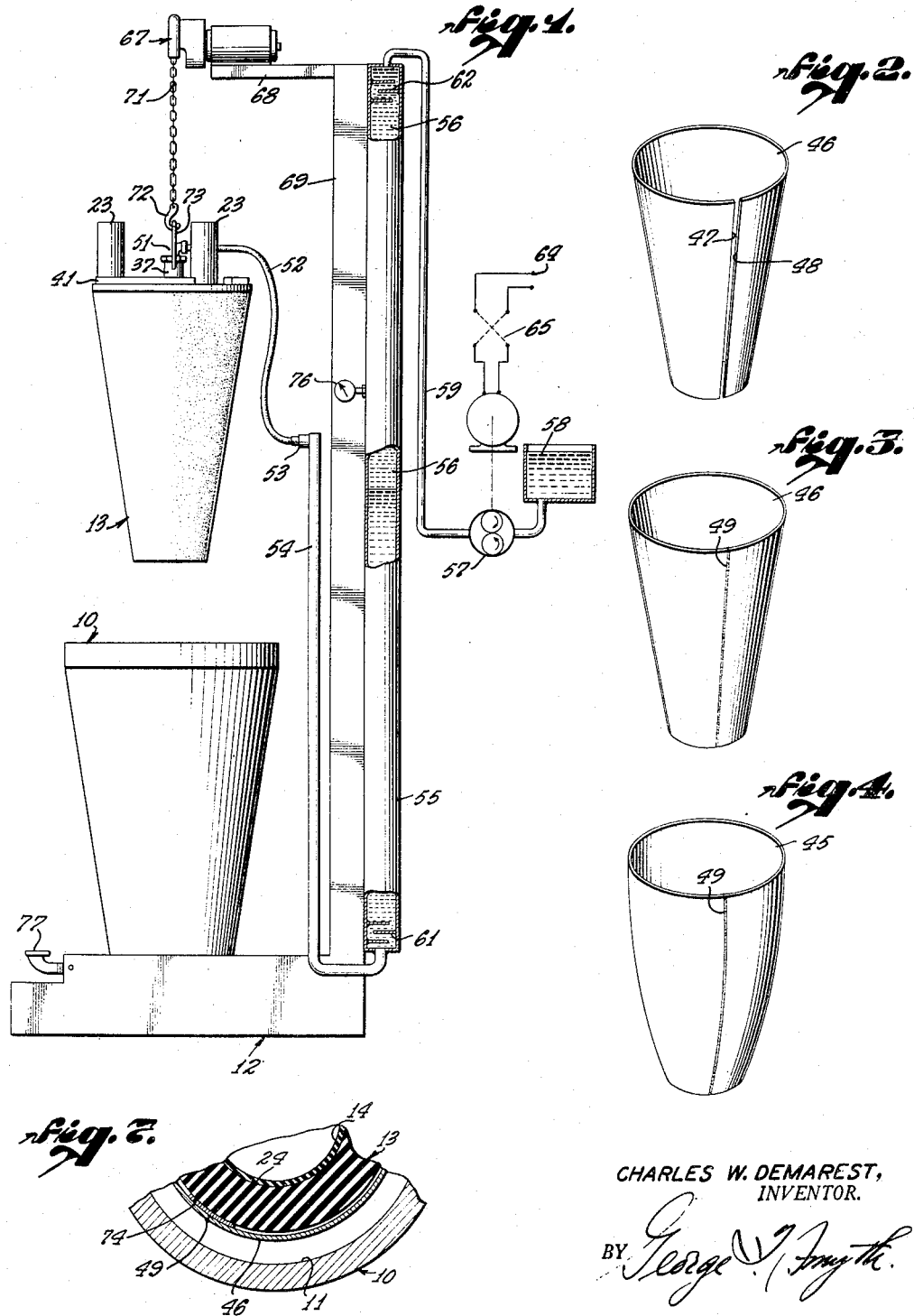

United States Patent Office 2,696,184
Patented Dec. 7, 1954

2,696,184

APPARATUS FOR FORMING HOLLOW BODIES

Charles W. Demarest, Malibu, Calif., assignor to Pastushin Aviation Corporation, Los Angeles, Calif., a corporation Application May 16, 1951, Serial No. 226,660

3 Claims. (Cl. 113—44)

This invention relates to apparatus for forming bodies to a predetermined outer contour or shape.

The present invention comprises means for forming bodies by creating an expanding force and for then applying this force to a work piece confined within a die cavity of a predetermined contour. The expansion forces created pressurally force the work piece outwardly against the walls of the die cavity and thus shape or form the work piece to the contour of the die cavity.

The invention herein disclosed is particularly useful in forming open ended or hollow casing-like members although, as will be made hereinafter apparent, the invention is not necessarily limited to forming such members. In the illustrated embodiment of the present invention such a member has been selected merely for the purpose of illustrating and explaining the invention.

The present invention eliminates the necessity of the expensive spinning and rolling operations heretofore used to accurately form many bodies to a predetermined outer contour or shape. The forming action, as above mentioned, is derived by the creation of an expanding force within the work piece while the latter is confined within a die cavity. The cavity is formed to the desired or predetermined contour in a rigid body member and, as will be seen, this body member with its cavity forms a female forming die. The expanding force is exerted by means of a male die formed as a hollow element of substantially resilient material. The normal outer contour of the male die, although it approximates the contour of the defining walls of the die cavity, is actually smaller and is readily received within the die cavity. This die member internally carries a relatively thin walled bag or lining element formed of an impervious material having a relatively high resiliency and therefore readily distensible.

The bag or lining member is not secured to the interior of the male die member and in fact is but loosely mounted within the die member. One feature of the present invention resides in the manner of mounting the bag which eliminates the necessity of any external sealing elements, the bag itself being sealed by the pressure used to distend the male die member. In fact, this pressure can be used, because of the structure of the male die member, to hermetically seal the opening in the member in which the bag is disposed.

In carrying out the method of the present invention, a work piece, preferably of a size and shape similar to the size and shape of the male die member, is mounted within the die cavity after which the male member is coaxially moved into the cavity. The cavity is now closed and a fluid is introduced into the bag or lining-like member under a pressure sufficient to expand the bag or lining-like member to thus distend the relatively resilient wall of the male die member. The distension of the male die member urges the work piece outwardly and into pressural engagement with the walls of the die cavity to shape or form the work piece to the contour of the die cavity.

So long as the material forming the wall of the male die member is homogeneous, that is possess the same relative flexibility or resiliency, the pressure created within the bag or lining-like member will produce substantially the same expanding force throughout all wall portions of the die member. This eliminates any unequal forming of various sections of the work piece and results in a better forming operation.

Other features and advantages of the present invention will be apparent from the following description when taken in connection with the accompanying drawing, in which:

Figure 1 is a schematic view of one embodiment of the forming apparatus of the present invention;

Figure 2 is a perspective view of a work piece shown in partial state of fabrication;

Figure 3 is a view similar to Figure 2, but showing the work piece in the state of fabrication just prior to the final forming operation;

Figure 4 is another perspective view of the work piece and showing the work piece in its final formed shape;

Figure 5 is a vertical section view of the forming die members of the present invention and showing the relative position of the parts just prior to the forming operation;

Figure 6 is a fragmentary view in section and showing the relative position of the parts during the forming operation;

Figure 7 is a section taken along line 7—7 of Figure 5;

Figure 8 is a top plan view of the parts shown in Figure 5; and

Figure 9 is a fragmentary view in section of means used to reinforce a portion of the wall of the male die member.

The apparatus of the present invention, referring now to the drawing and more particularly to Figure 5, comprises a die member 10 having a forming cavity 11 of some predetermined contour. This die member, referring now to Figure 1, is rigidly supported by a base element 12 in such a position thereon that it is aligned with a movable die member 13 forming the male die of the set. This male die member, as best shown in Figure 5, is somewhat conical in shape and is formed of a substantially resilient material such as rubber or rubber-like material having a Shore hardness of 60. The die member 13 is formed with a blind opening 14 of such a size and shape as to produce a wall thickness which progressively decreases with the outer diameter of the die member.

Embedded within the material of the die member 13 at circumferentially spaced points around the upper portion thereof are a plurality of short rods 15. Each rod serves to anchor within the material of the die member one end of a length of chain 16, each of which extends upwardly of the die member and through an opening 17 formed in a plate 18 facewisely engaging the upper end of the die member 13. Attached to the free end of each of the chains 16 is an eye bolt 19 which is passed through a spring retainer 20. Threadedly mounted to the protruding end of each eye bolt is a fastening element 21, such as a nut, which prevents retraction of the eye bolt 19 from the retainer 20. Compressed between the retainer 20 and the one face of the plate 18 is a coil spring 22 which normally tends to urge the retainer 20 upwardly, as viewed in Figure 5, and thus hold each chain 16 taut and the upper edge face of the die member 13 in engagement with the under surface of the plate 18. A sleeve 23, welded or otherwise fixed to the upper face of the plate 18, circumscribes each spring and forms a spring guide sleeve, as clearly shown in Figure 5.

The just described assembly actually connects the body element of the die member 13 to the plate 18, but yet will allow the body member to move relative to the plate 18. The reason for this movement will be understood after the forming action of the die member is fully explained.

Mounted within the body element of the die member 13 is a bag or lining-like member 24 formed of an impervious material having a relatively high resiliency. This bag or lining-like member, in the now preferred embodiment of the apparatus, is formed of a high grade of india rubber or latex shaped to nest within the opening 14 of the body element of the die member 13. The upper end of the bag 24 is folded inwardly upon itself to form an inturned neck-like section 25 held by its own resiliency in engagement with an annulus 26 of rubber or like material bonded about the outer surface of a large sleeve 27 concentrically fixed to a plate 28.

The annulus 26 of rubber forms an integral part of a molded member 29 which encases the upper end section of the bag or lining-like member 24. The outer diameter of the member 29 is substantially equal to the inner diameter of the body element of the die member 13, so that this member forms a plug-like element mounted within the upper end of the opening 14. This member is not only bonded to the outer surface of the sleeve 27, but also to the under-face of the plate 28. The outer cylindrical surface thereof is not bonded or otherwise secured to the wall of the opening 14 so that their contacting surfaces may slide relative to each other.

The member 29 forms a sealing element, as will be hereinafter seen, and to reinforce this member against the expanding forces to be used to create the forming pressure, some means should be provided to prevent downward flow of the material thereof. This means may comprise a ring 31 embedded within the material of the same and passed in loop form over this ring, as best seen in Figure 9 is an elongate flexible strand 32. The ring 31, referring again now to Figure 5, is disposed within the part 29 adjacent the upper end thereof while the loops of the strand 32 longitudinally extend within the body substantially the entire length thereof. This strand although it reinforces the member 29 nevertheless allows the member to expand and follow the outward movement of the wall of the body element of the die member 13 during the forming operation.

To further reinforce the part 29, a sleeve 33 is secured about the peripheral edge of the plate 28 and depends therefrom into the opening 14 to thus circumscribe the upper end portion of the part 29. This sleeve actually forms, as will be later seen, a back-up ring for the resilient material and prevents extrusion of the same between the plate 28 and the die member 13.

The plate 28 is formed with a centrally located opening through which extends a short length of pipe or conduit 34. The pipe or conduit is held in position in the opening of the plate 28 by welding indicated at 35, which also seals the annular space between the conduit 34 and the opening in the plate. The upper end of the conduit 34 is formed with external threads for threadedly engaging the internal threads of a large nut 36, which is used to clamp a cylindrical spacing member 37 against a washer 38 superimposed over a second spacing member in the form of a bushing 39 circumscribing the conduit 34 and supported on the upper face of the plate 18. It will be seen that as the nut 36 is threaded down over the upper end of the conduit 34, the spacing bushing 39 will be clamped against the upper face of the plate 18 to rigidly assemble this plate with the plate 28.

Formed about the wall of the cavity 11 at the upper end thereof is an annular groove 40 adapted to receive arcuate locking members 41 pivotally interconnected through short links 42 with a rotatable actuator plate 43. The actuator plate 43 is centrally formed with an opening of a diameter just slightly larger than the outer diameter of the spacing bushing 39. The thickness of the plate 43 is less than the height of the bushing 39 so that this plate is free to rotate in the annular groove formed in effect by the one face of the washer 38, the outer surface of the bushing 39, and the upper face of the plate 18.

To rotate the actuator plate 43, the latter carries a pair of upstanding handle elements 44, as best seen in Figure 8, which, when grasped by the hands of the operator, can be arcuately swung to bring about rotation of the actuator plate 43. The locking elements 41 are so interconnected to the actuator plate 43 by means of the links 42 that rotation of the plate 43 in one direction forces the locking elements 41 radially outward and into engagement with the annular groove 40 to securely lock the die member 13 within the cavity 11.

The work piece to be formed in the illustrated embodiment of the present invention will take a formed shape complementary to the defining surfaces of the cavity 11. The work piece in its finally formed shape is shown in Figure 4. This work piece is formed from a metal sheet 46 rolled into the shape shown in Figure 3 with the opposite end faces 47 and 48 in abutting relationship. These abutting faces are then joined by a welding operation to form the part shown in Figure 3, the line of weld being indicated at 49. The work piece in the partially fabricated form shown in Figure 3, in carrying out the method of the present invention, is mounted within the cavity 11 after which the die member 13 is inserted into the work piece. The actuator plate 43 is then rocked to move the locking elements 41 outwardly and into interlocking engagement with the groove 40 to hold the die member 13 within the cavity 11.

With the die members in the position shown in Figure 5 introduction of a fluid under pressure into the bag or lining-like member 24 will, as the pressure is increased, cause this element to expand and distend the walls of the body element of the die member 13 to pressurally force a work piece 45 outwardly to ultimately expand the work piece into engagement with the defining surfaces of the cavity 11.

In the embodiment of the invention now preferred, fluid under pressure is introduced into the bag or lining-like member 24 by a nozzle or similar element 51 mounted in the upper end of the passage of the conduit 34 by some conventional means. The nozzle 51 is connected to one end of a flexible conduit 52 leading, referring now to Figure 1, to a fitting 53 flow connected to the upper end of a pipe 54. The pipe 54 leads to the lower end of a vertically arranged cylindrical chamber 55 holding the fluid to be introduced into the bag or lining-like member 24. In the now preferred embodiment of the invention, this fluid is water and the water is urged through the pipe 54, flexible conduit 52, and into the die member 13 by the pressure developed on a column of oil 56 substantially floating on the column of water held by the lower portion of the cylindrical casing 55.

A pump 57, to which oil is delivered from a reservoir 58 open to the atmosphere, forces oil from the discharge side through the pipe 59 into the upper end of the cylindrical casing 55. It should be seen that pressure on the oil developed by the pump 57 will force the water downwardly in the casing 55 and thence through the pipe 54 and flexible conduit 52 into the bag or lining-like member 24.

Water has been chosen for the expanding media as it has little, if any, harmful effects on the resilient material of which the bag 24 is formed. The pressure supply fluid, that is the oil, as it has a specific gravity less than water will always remain in the upper portion of the casing 55 and experience has found that there is very little intermixing of the water and oil within the casing 55. To prevent any surging which might occur in the operation of the device, baffle elements 61 and 62 are mounted within the casing 55 adjacent the lower and upper ends thereof, respectively. These baffle elements tend to break up and diffuse the high velocity streams of water and oil which are produced as the oil is pumped into the upper end of the casing and when the water flows upwardly in the casing at the completion of the forming cycle.

The pump, in the illustrated embodiment of the invention, is driven through a reversible electric motor 63 from a suitable source of current indicated at 64. A reversing switch 65 is provided in the motor circuit for selectively driving the pump 57 in one direction or the other.

In carrying out the method of the present invention, the work piece to be formed after it has been fabricated to the form shown in Figure 3, is inserted into the cavity 11. The male die member 13 is now lowered through a hoist arrangement indicated at 67 and supported by an arm 68 carried by the large stanchion 69 to which the casing 55 is mounted. The hoist includes a chain 71 carrying at one end a hook 72 engageable in an eye 73 fixed to the conduit 34. This conduit, it will be remembered, was welded in position in the opening in the plate 28 which facewisely engages the under surface of the plate 18.

After the die member 13 is lowered into position, as shown in Figure 5, the locking elements 41 are urged outwardly to engage in the groove 40 formed in the upper end of the cavity 11. The motor 63 is now energized to operate the pump 57 to draw oil from the reservoir 58 upwardly through the pipe 59 and force the same into the upper end of the casing 55. The pressure thus created on the oil 56 displaces the water in the lower end of the casing upwardly through the pipe 54 and flexible conduit 52 into the bag or lining-like member 24. As the pressure on the oil increases through continued operation of the pump 57, the internal pressure of the water held by the bag 24 will bring about expansion of the latter to distend the walls of the die member 13 and pressurally force the work piece outwardly and into engagement with the defining surfaces of the cavity 11.

As the pressure increases and the walls of the die member 13 move outwardly, the walls tend to creep or shorten, as indicated in Figure 6. This movement of the walls relative to the plate 18 is permitted by the compression of the springs 22 which brings about downward movement of the spring retainers 19 to which the upper ends of the chains 16 are secured. The springs 22 thus take the load imposed by the initial outward movement of the walls and obviates possible destructive forces in the walls because of the tensile stresses which otherwise would be created.

As the work piece is urged into engagement with the defining surfaces of the cavity 11, continued application of the forming pressure causes the material of the wall of the body element of the die 13 to flow upwardly until the upper edge face of the body element again engages the under surface of the plate 18. Once the material of the body element of the die member 13 in effect completely fills the space into which it can flow, the full pressure existing within the bag, as the wall of the body element is now for all practical purposes a solid member, will complete the final forming or shaping of the work piece in accordance with the contour or configuration of the cavity 11.

During the distention of the wall of the body element of the die member 13, the member 29 will also be forced outwardly, as clearly shown in Figure 6, the outer surface of the member 29 engaged with the surface of the wall of the opening 14 moving relative to the latter during this cycle of operation while maintaining good pressural engagement therewith.

The pressure created within the bag 24 is, of course, equally distributed over the bag 24 and the in-turned neck portion 25 is compressed inwardly against the annulus 26 bonded to the outer surface of the collar 27 to effectively seal the annular space between the inturned neck portion 25 and the annular mass 26. In fact, it will be seen that the internal pressure against the wall of the bag, which pressure is in turn transmitted to the member 29 and by the member 29 to the wall of the body element of the die member 13, acts to effectively seal the only possible avenue of escape of the fluid forced into the bag 24.

Although not at all times necessary, it has been found expedient at times to insert a pressure distributing plate 74, referring now to Figure 7, between the weld 49 and the outer surface of the body element of the die member 13. This plate tends to relieve the weld 49 of a part of the expanding forces generated by the fluid and eliminates the danger of the weld failing during the forming or expanding operation.

A pressure indicating gauge 76 sensitive to the pressure within the fluid system is preferably mounted so that the operator may determine the pressure existing within the male die member. Once the predetermined pressure necessary to complete the forming operation has been determined, the motor 63 can be reversed as soon as the gauge 76 shows that the predetermined pressure has been reached. It should be understood that reversal of the motor 63 will drive the pump 57 in the direction necessary to return oil from the casing 55 back to the reservoir 58 whereupon the distended walls of the body element of the die member 13 urges the water held by the bag or lining member 24 back through the conduit 52 and pipe 54 to the casing 55. Once the pressure within the die member 13 has returned to zero, the actuator plate 43 may be rocked or rotated in the direction necessary to bring about release of the locking members 41 from the groove 40. After the release of the locking members 41, the hoist member can be operated to withdraw or lift the die member 13 from the cavity 11.

To facilitate removal of the formed work piece an ejecting device, not shown but actuated by a foot pedal 77, may be used to urge the formed work piece upwardly in the cavity a distance sufficient to permit the operator to grasp the work piece and withdraw it upwardly from the cavity.

It should be seen now that the present invention provides a method and means for forming bodies by creating an expanding force within a male die member formed of a distensible material which, when distended, pressurally forms the work piece to the predetermined contour or configuration of the cavity of a female die. As the expanding force is produced by a fluid under pressure, which is confined within a closed system at all times, there is no mess attendant with the forming operation.

The apparatus has been found to have a long service life for there is little likelihood of the male die member deteriorating with use. As the body element of the male die member 13 is not used to confine the fluid under pressure, this material need not be impervious to the fluid. The bag or lining-like member 24, which actually confines the fluid within the die member 13, is adequately supported at all times by the walls of the cavity 14 of the die member and experience has shown that the service life of this member is long. If a leak should develop in the bag or lining-like member 24, the defective bag is easily removed for substitution by a new bag as the same, it will be remembered, is not permanently anchored in any way to the structure making up the male die member.

Although the now preferred embodiment of the present invention has been shown and described herein, it is to be understood that the invention is not to be limited thereto, for it is susceptible to changes in form and detail within the scope of the appended claims.

I claim:

1. Forming apparatus of the type described, comprising: a female die member having a cavity of a predetermined size and shape; a hollow male die member open at one end and formed of a resilient material; a thin member of resilient material lining and enveloped by said male die member and presenting an opening contiguous to the opening of said member; plate means closing the opening of said male die member; a sleeve carried by said plate means and projecting within said male die member; an annulus of resilient material bonded to the inner face of said plate means and the outer surface of said sleeve; the open end of said lining member being inturned to circumscribe the portion of said annulus bonded to said sleeve; means yieldingly interconnecting said male die member and said plate means; means for mounting said male die member for movement into said cavity; means for holding said plate means against retraction from said cavity; and means for introducing into said male die member a fluid under a pressure sufficient to expand said lining member to distend said male die member to pressurally form a work piece disposed in said cavity to the size and shape thereof, the fluid under pressure holding said inturned portion of said lining member in good sealing engagement with the portion of the annulus circumscribing said sleeve.

2. Forming apparatus of the type described, comprising: a female die member having a cavity of a predetermined size and shape; a male die member adapted to cooperate with the walls of said cavity to form a work piece to the size and shape thereof; said male die member comprising a hollow body member open at one end and formed of a resilient material, a relatively thin lining member of resilient material disposed within and enveloped by said body member and presenting an opening contiguous to the opening thereof, plate means closing the opening of said body member, a sleeve carried by said plate means and projecting within said body member, an annulus of resilient material bonded to the inner face of said plate means and the outer surface of said sleeve, the open end of said lining member being inturned to circumscribe the portion of said annulus bonded to said sleeve, and means yieldingly interconnecting said body member and said plate means; and means for introducing into said body member a fluid under a pressure sufficient to expand said lining member to distend said body member to pressurally form a work piece disposed in said cavity to the size and shape thereof, the fluid under pressure holding said inturned portion of said lining member in good sealing engagement with the portion of the annulus circumscribing said sleeve.

3. Forming apparatus of the type described, comprising: a female die member having a cavity of a predetermined size and shape; a hollow male die member open at one end and formed of a resilient material; a thin member of resilient material lining and enveloped by said male die member and presenting an opening contiguous to the opening of the same; plate means closing the opening of said male die member; a sleeve carried by said plate means and projecting within said die member; an annulus of resilient material carried with said hollow die member and bonded to the inner face of said plate means and the outer surface of said sleeve; the open end of said lining member being inturned to circumscribe the portion of said annulus bonded to said sleeve; a second sleeve circumscribing said plate means and the portion of said annulus bonded thereto for confining the latter; means yieldingly interconnecting said male die member and said plate means; means for mounting said male die member for movement into said cavity; means for holding said plate means against retraction from said cavity; and means for introducing into said male die member a fluid under a pressure sufficient to expand said lining member to distend said male die member to pressurally form a work piece disposed in said cavity to the size and shape thereof, the fluid under pressure holding said inturned portion of said lining member in good sealing engagement with the portion of the annulus circumscribing said sleeve, said annulus expanding and maintaining sealing engagement with the interior wall surface of said male die member as the latter distends to pressurally force the work piece into engagement with the wall of the cavity.

References Cited in the file of this patent

UNITED STATES PATENTS

| Number | Name | Date |
|---|---|---|
| 270,342 | Sargent | Jan. 9, 1883 |
| 731,367 | Huber | June 16, 1903 |
| 890,409 | Cox | June 9, 1908 |
| 1,023,764 | Senac | Apr. 16, 1912 |
| 1,637,532 | Oliver et al. | Aug. 2, 1927 |
| 1,934,292 | Barker | Nov. 7, 1933 |
| 2,298,132 | Johnson | Oct. 6, 1942 |
| 2,344,779 | Kolderman | Mar. 21, 1944 |
| 2,348,871 | Wiley | May 16, 1944 |
| 2,354,564 | Wiley | July 25, 1944 |
| 2,385,083 | Kemerer | Sept. 18, 1945 |
| 2,493,053 | Zatyko | Jan. 3, 1950 |
| 2,533,528 | Somersall | Dec. 12, 1950 |

FOREIGN PATENTS

| Number | Country | Date |
|---|---|---|
| 523,948 | Great Britain | July 25, 1940 |